No. 663,052.  
H. B. TODD.  
CRATE.  
(Application filed Oct. 6, 1897.)  
Patented Dec. 4, 1900.

(No Model.)

Witnesses:  
William H. Barker.  
Arthur B. Jenkins.

Inventor:  
Henry B. Todd  
by Chas. L. Burdett,  
Attorney.

UNITED STATES PATENT OFFICE.

HENRY B. TODD, OF AVON PARK, FLORIDA.

CRATE.

SPECIFICATION forming part of Letters Patent No. 663,052, dated December 4, 1900.

Application filed October 6, 1897. Serial No. 654,260. (No model.)

*To all whom it may concern:*

Be it known that I, HENRY B. TODD, a citizen of the United States, and a resident of Avon Park, in the county of De Soto and State of Florida, have invented certain new and useful Improvements in Crates, of which the following is a full, clear, and exact description, whereby any one skilled in the art can make and use the same.

My invention relates to the class of devices used for safely packing fruits and vegetables for transportation or storing; and the object of my invention is to provide a device of this class so constructed as to necessitate the storing or packing of the fruit in a certain predetermined position.

To this end my invention consists in the details of construction of the device and in the combination of parts making up the crate as a whole, as hereinafter described, and more particularly pointed out in the claims.

Figure 1:
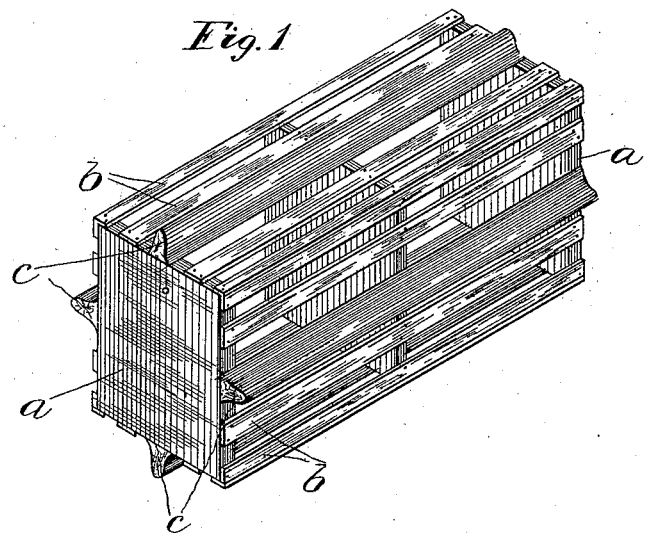
Figure 2:
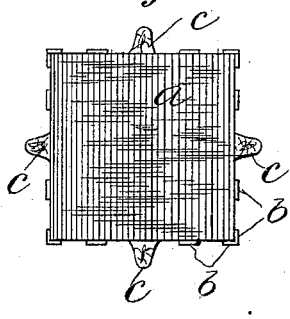
Figure 3:
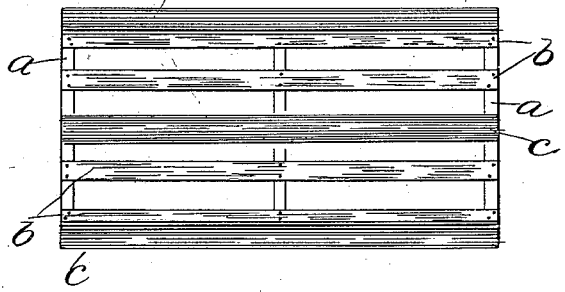

Referring to the drawings, Figure 1 is a perspective view of a crate embodying my invention. Fig. 2 is an end view of the same. Fig. 3 is a side view of the same.

In packing or crating fruit and vegetables for transportation prior to my invention a difficulty had been experienced in attempts to so pack the fruit that it would not be injured in the handling of the packages in which it was contained. It is essential to the proper preservation of the fruit that plenty of ventilation shall be had and a common practice has been to construct the crates of end pieces of considerable thickness with thin slats nailed thereto, a space being left between the slats for ventilating purposes, thin slats being used for the purpose of securing lightness for the crate. In the employment of such a crate a blow upon the thin slats, as from a fall of the crate, bruises the fruit lying on that side of the crate, the thin slats not having sufficient rigidity to prevent the blow being transferred to the fruit through the springing action of the slats.

In the packing of some fruit, as pineapples, it is essential that the fruit shall be maintained in an upright position either end up, and a common practice is to pack the fruit with the butts and crowns projecting alternately in the same direction, the ends of the fruit protecting the main part if the fruit is maintained in this position; but if maintained in a position with the sides uppermost the fruit is bruised at these points. As before stated, all of the fruit of this description is placed in the crate in a certain position with the butts or crowns uppermost; but there has been no means prior to my invention for insuring that the fruit shall be maintained in this position during packing or transportation.

By the use of my improved device I have provided means whereby a crate may be constructed in part of thin slats, as heretofore, without danger of bruising of the fruit by blows on the slats, and I have also provided means whereby fruit packed for transportation in the predetermined position shall be maintained to a considerable extent in that position during transportation.

In the accompanying drawings the letter $a$ denotes the end portions of a crate constructed usually of wood or other light material of a considerable thickness, these end portions being united by thin slats $b$ of any desired material suitably secured to the end portions. The slats $b$ are attached to the end portions so that in the case of a rectangular-shaped crate one of the slats on one side of the crate will overlap the edge of a slat on the side next to it at the corner. By this construction any blow at the corner of the crate will not be transmitted to the fruit.

A shield $c$, constructed of any desired light material, usually wood, is secured to the sides of the crate, this shield projecting to a considerable extent beyond the outer surface of the slats. This shield is usually constructed of approximately-angular form and so attached to the crate that it will not firmly rest in position if placed on this side. A like rib or shield applied to the opposite side of the crate will prevent another crate being placed on top, and it will be seen from this construction that it will be impossible to construct a pile of crates having my improvement so that they will rest with any firmness. The sides on which it is desired the crate shall rest are constructed flat as to their surfaces and without a shield, and the fruit is packed in the crate with particular reference to such sides. The crates may be piled to any extent in a car or steamer and resting on these sides with the desired degree of firmness.

By the use of the shields or ribs the crates are also prevented from being packed so close together as to prevent air from freely circulating between them.

I have shown and described herein one means of preventing the placing of a crate in any but the predetermined position for the purpose of transportation; but any means that will secure this result will come within the scope of the invention, and I do not desire to limit myself to the precise means herein shown and described.

I claim as my invention—

1. A packing box or crate having two flat opposing bearing-surfaces upon which the box is adapted to rest, and a single shield located on and extending in a straight line across each of the other surfaces of the crate and having a comparatively narrow outer edge whereby a tipping movement is caused with the box resting on these strips.

2. A packing box or crate composed in part of thin strips of material and having two flat opposing bearing-surfaces on which the box is adapted to rest, and a single shield located on and extending in a straight line across each of the other surfaces of the crate and having a comparatively narrow edge, whereby a tipping movement is caused with the box resting on these strips.

HENRY B. TODD.

Witnesses:
R. DUGAL HALL,
A. W. SARGENT, Sr.